United States Patent [19]
Bell

[11] 3,747,218
[45] July 24, 1973

[54] APPARATUS FOR AUTOMATICALLY MEASURING PIPE RUNNING INTO OR OUT OF A WELL

[76] Inventor: Leo A. Bell, 108 Vista Plaza, Odessa, Tex. 79760

[22] Filed: Feb. 10, 1971

[21] Appl. No.: 114,271

[52] U.S. Cl. ............................................. 33/134 A
[51] Int. Cl. ........................... G01b 3/12, G01b 5/04
[58] Field of Search ...................... 33/134 R, 134 A; 73/151.5; 254/173

[56] References Cited
UNITED STATES PATENTS 2,860,417  11/1958  Knight .............................. 33/134 R
1,870,362  8/1932  Hart ................................. 33/134 A
2,096,995  10/1937  Mizell .............................. 73/151.5
2,539,758  1/1951  Silverman et al. ................. 73/151.5

FOREIGN PATENTS OR APPLICATIONS 125,831  7/1931  Austria ............................. 73/151.5

Primary Examiner—Louis R. Prince
Assistant Examiner—Charles E. Phillips
Attorney—Pravel, Wilson & Matthews

[57] ABSTRACT

Apparatus for automatically measuring pipe running into or out of a well, whereby the amount of pipe in the well is automatically indicated.

3 Claims, 3 Drawing Figures

PATENTED JUL 24 1973　　3,747,218
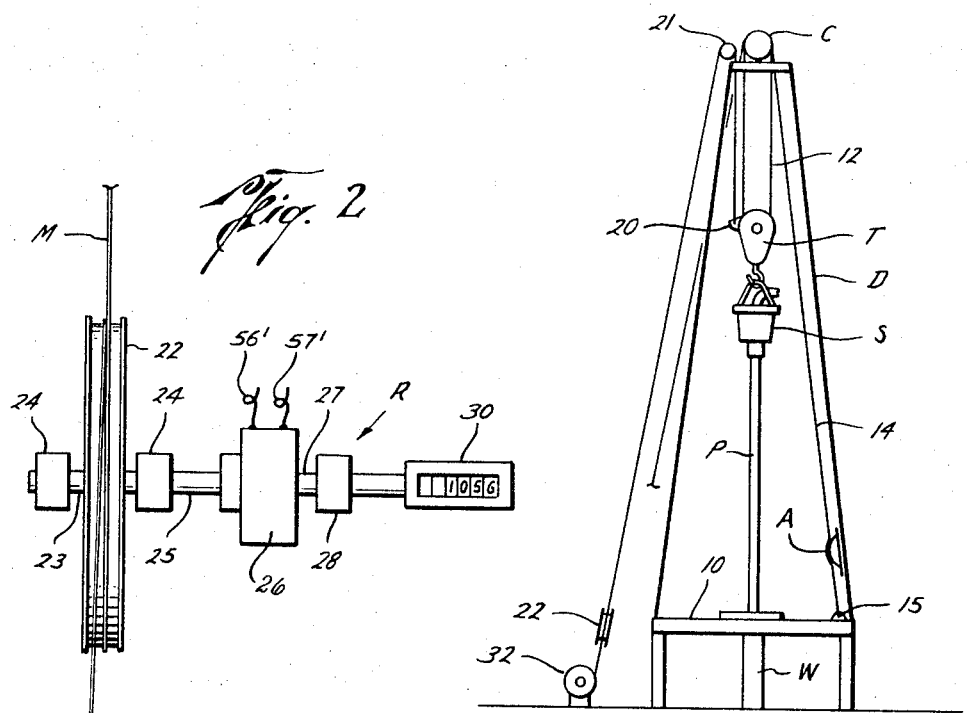
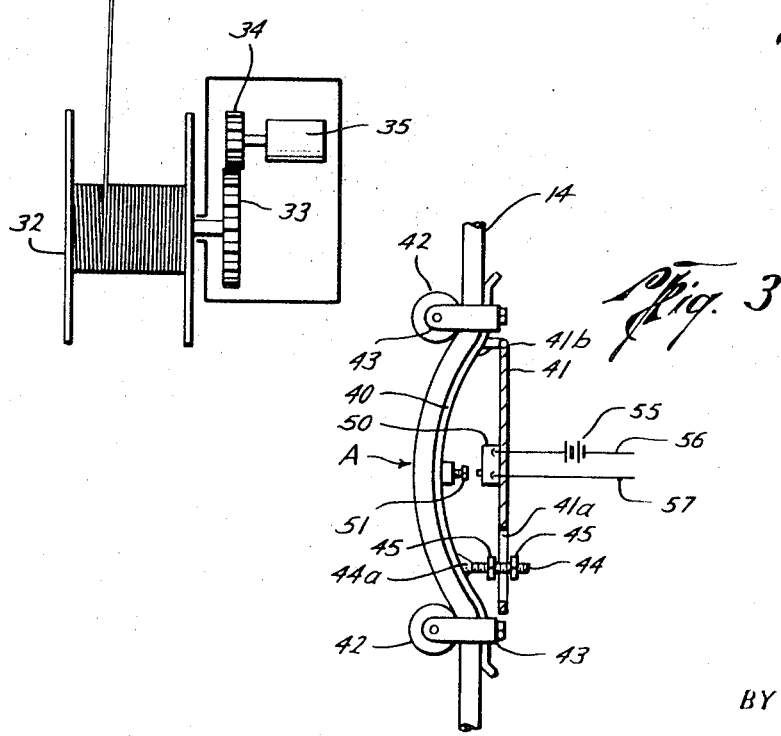
Leo A. Bell
INVENTOR
BY
Pravel Wilson & Matthews
ATTORNEYS

1

APPARATUS FOR AUTOMATICALLY MEASURING PIPE RUNNING INTO OR OUT OF A WELL

BACKGROUND OF THE INVENTION

The field of this invention is apparatus for measuring pipe running into and out of a well.

In the past, various mechanisms have been tried in an attempt to measure the amount of pipe actually in a well. Typically, such prior art devices have employed rollers or other means which physically contacted the pipe for such measurements, but because of irregularities in the pipe, mud on the pipe and other interference, the readings obtained with such physical contact devices have not been commercially satisfactory.

SUMMARY OF THE INVENTION

The present invention relates to an apparatus for automatically measuring pipe running into and out of a well without physically engaging the pipe with the measuring apparatus, whereby an accurate measurement of the amount of pipe in the well is obtained. A measuring line is attached to a travelling block and is operably engaged with a measuring unit only when pipe is supported by the travelling block so that movements of the travelling block without any pipe are not indicated by the measuring unit.

BRIEF DESCRIPTION OF THE DRAWING

FIG. 1 is an elevation of the apparatus of this invention in position for use in connection with a travelling block which is mounted on a well derrick;

FIG. 2 is an enlarged view of the measuring unit and measuring line therewith which forms a part of the apparatus of this invention; and FIG. 3 is an elevation, partly in section, illustrating one embodiment of a sensing device which forms a part of the apparatus of this invention.

DESCRIPTION OF THE PREFERRED EMBODIMENT

In the drawings, the letter D designates generally a conventional well derrick which is adapted to be positioned over a well for the purpose of running tubing or pipe P into or out of a well below the derrick D, having well casing W or the like extending upwardly therefrom to a platform 10 forming a part of the derrick D. The pipe P is handled in the usual manner with a travelling block T which is suspended from a crown block C by means of a plurality of lines 12 extending therebetween. The end of the line 14, commonly known as a "dead line" is attached at any suitable point on the derrick D such as indicated at 15. Typically, a swivel S is suspended from the travelling block T and the upper end of the pipe P is releasably connected to the swivel S in the known manner.

The apparatus of this invention includes a sensing device A (FIGS. 1 and 3) or any other suitable means for sensing when the travelling block T is suspending the pipe P therefrom, for a purpose to be hereinafter more fully described. A measuring line M has one end 20 thereof connected to the travelling block T and it passes over a suitable pulley 21 on the derrick D and then downwardly around a measuring wheel 22 (FIGS. 1 and 2).

The measuring wheel 22 forms a part of a measuring unit R (FIG. 2) which has an indicator or readout device 30 therewith for indicating at all times the amount of pipe P which is actually in the well W.

As illustrated in FIG. 2, the measuring wheel 22 has the measuring line M in operable engagement therewith so that movements of the line M longitudinally cause rotation of the measuring wheel 22. As illustrated in FIG. 2, the measuring line M is looped around the measuring wheel 22 so as to assure adequate engagement therebetween so that all movements of the measuring line M are converted into rotary movements of the measuring wheel 22. The measuring wheel 22 is supported on a rotatable shaft 23 mounted in suitable bearings 24, or it is otherwise suitably supported. The shaft 23 either extends beyond the righthand bearing 24 or is integrally connected to shaft 25 which is connected to an electro magnetic clutch-brake 26 of any conventional construction. So long as the clutch 26 is engaged, the rotational movement of the shaft 23 and the shaft 25 are transmitted through such clutch 26 to a shaft 27. The shaft 27 is supported in a bearing 28 or any other suitable support means so that it can rotate and drive or operate the indicator or footage counter 30 which also is of conventional construction.

The measuring line M extends to a reel 32 which wraps up the measuring line M so as to constantly exert a pulling force on the line M to maintain it under tension at all times. Such tension is preferably maintained by connecting the reel 32 through the gears 33 and 34 to an air motor 35 which is constantly acting in a direction to wind up the measuring line M on the reel 32, but which will permit an unwinding of the measuring line M as the end 20 of such line M is pulled downwardly by the downward travel of the travelling block T, as will be more evident hereinafter. The sensing device A is illustrated by way of example only since other sensing devices which sense when the travelling block T is moving with the pipe P thereon may be utilized. The sensing device A illustrated in the drawings includes a leaf spring 40 which is curved and which is welded or is otherwise connected at its upper end to a support plate 41. The dead line 14 is adapted to pass over and engage the external surface of the leaf spring 40. To maintain such contact, a pair of rollers 42 mounted on brackets 43 are provided for the engagement of the line 14 as illustrated in particular in FIG. 3. The support member 41 has a slot 41a therein so that it can move relative to the leaf spring or resilient member 40 when the leaf spring or resilient member 40 is moved towards a flattened condition so as to reduce the gap between the spring 40 and the support member 41. An adjustable aligning bolt 44 having movable nuts 45 is disposed so that the bolt 44 passes through the slot 41a with the nuts 45 on each side of the support plate 41. The nuts 45 serve as limits for lateral movement of the support member 41, while the slot 41a permits longitudinal movement of the support member 41 relative to the bolt 44. The bolt 44 is welded or is otherwise affixed at 44a to the leaf spring 40. If desired, the upper end of the support member 41 may be pivotally connected to the leaf spring 40 so that an adjustment in the spacing between the support member 41 and the leaf spring 40 may be effected. In this connection, it should be noted that an electrical switch 50 is mounted on the support member 41, and an actuating member 51 is supported on the leaf spring 40. When a predetermined amount of tension develops in the dead line 14 as a result of pipe P being supported and suspended by the travelling block P, the actuating member 51 is moved with the leaf spring 40 as it is moved towards a flattened position so as to cause the member 51 to actuate the switch 50. It will be appreciated that the switch 50 could be on the spring 40 and the actuating member 51 could be on the support member 41. In any event, the switch 50 is not actuated unless there is pipe P supported by the travelling block T because unless such condition exists, the dead line 14 is not under sufficient load or tension to move the actuating member 51 into operating engagement with the switch 50.

The switch 50 is a part of an electrical circuit having a battery 55 or other source of electrical power therewith (FIG. 3) and which also has electrical wires 56 and 57 which are connected to corresponding wires 56 and 57 attached to the electro magnetic clutch-brake 26 (FIG. 2). Thus, the closing of the switch 50 completes an electrical circuit to the electro magnetic clutch 26 to engage same or disengage same, depending upon how such clutch 26 is electrically connected, as will be understood. In any event, the closing of the switch 50, which occurs when pipe P is being supported by the travelling block T results in the clutch 26 connecting the shaft 25 and the shaft 27 so that movements of the measuring wheel 22 are then transmitted to the indicator 30. When the switch 50 is released by a relaxing of the tension in the deadline 14 due to the pipe P being removed from the travelling block T, the clutch 26 is disengaged, and preferably a brake which is used in combination therewith in a conventional manner, serves to disconnect the shaft 25 and the shaft 27 and to hold the shaft 27 against rotation even though there may subsequently be rotation of the shaft 25. It should be noted that the space between the actuator 51 and the switch 50 may be adjusted by adjusting the length of the actuator 51 in any conventional manner, or the support member 41, which is preferably pivotally connected at 41b to the leaf spring 40, may be moved by changing the limit screws 45 on the bolt 40. Also it should be understood that the clutch-brake 26 may be simply an electro magnetic clutch without the brake since the brake is merely a safety factor which makes certain that the indicator or recorder 30 does not move inadvertently when the clutch 26 is disengaged.

As a further alternative, the switch 50 may be in an air system or may be electrically connected to an air system so that air is utilized rather than electricity for engaging and disengaging a clutch 26 of an air actuated type. Various other alternatives in such control mechanism will be readily appreciated by those skilled in the art.

In the use of the apparatus of this invention, it will first be assumed that the measuring line M is in the position shown in FIG. 1 with the pipe P supported by the travelling block T. Under such circumstances, the sensing device A will have been actuated so that the switch 50 is closed and the clutch 26 is engaged. As the travelling block T is lowered with the pipe P thereon, the measuring line M will transmit its longitudinal movements to the measuring wheel 22 so as to rotate same, and the rotary movements of the wheel 22 will be transmitted through its axle or shaft 23 to the shafts 25 and 27 and thus to the counter 30 which normally reads in feet in the known manner. Thus, as the pipe P is lowered into the well, the number of feet of pipe which is then being added will increase the reading on the readout indicator 30 so that the indicator 30 indicates the actual number of feet of pipe in the well.

When the upper end of the pipe P has reached the area of the platform 10 of the derrick D, the pipe P is detached from the swivel S in the known manner and then is supported in the slips in the known manner at the platform 10. At that point, the travelling block T no longer supports or suspends the pipe P and the tension in the dead line 14 will be removed or reduced so that the actuating member 51 no longer engages the electrical switch 50. When the switch 50 opens, the clutch 26 is disengaged and thereafter, the measuring line M moves without transmitting its movements through the measuring wheel 22 beyond the shaft 25, so that there is no recording of the movements of the measuring line M under such conditions.

Under normal operating conditions, the travelling block T is hoisted upwardly in the derrick D without any pipe P thereon and this of course will move the measuring line M since the line M is maintained under tension at all times with the reel 32 and the air motor 35 as previously explained. The measuring wheel 22 will also turn as the line M is wound up on the reel 32, but since the clutch 26 is disengaged, the movements of the line M are not recorded on the indicator or counter 30 while the travelling block T is moving in the derrick D without any pipe P thereon.

When the next stand of pipe is connected to the swivel S, which occurs with the travelling block T near the upper end of the derrick D, the dead line 14 is again placed under a load and in enough tension to move the leaf spring 40 towards the support plate 41 for causing the actuating member 51 to close the switch 50 thereby again closing and engaging the clutch 26. Then, as the travelling block T is lowered to lower the pipe P into the well, the measuring line M will move with the travelling block T and such movement will be recorded and counted on the counter 30. Such sequence of operation continues so long as pipe P is being lowered into the well. Thus, only the length of pipe which is actually being introduced into the well is counted and indicated on the indicator 30 so that an operator knows at all times how much pipe is actually in the well and this can be readily read on the readout indicator 30.

When pipe P is removed from the well, the opposite procedure takes place so that a subtraction on the indicator 30 occurs for each section of pipe P which is removed from the well. For example, with the travelling block T near the bottom part of the derrick D and with the swivel S engaged with the upper end of the pipe P at about the level of the platform 10, the travelling block T is again supporting the pipe P and this is sensed by the sensing device A so that the clutch 26 is engaged. Thereafter, as the travelling block T moves upwardly with the pipe P suspended therefrom, the measuring line M is wound upon the reel 32 and the movement of the line M is directly transmitted to the readout indicator 30, but in a reverse direction to the movement when the pipe P is being lowered into the well. Therefore, there is a subtraction of the number of feet of the pipe P which is withdrawn from the well.

At the upper end of travel of each stand of the pipe P, the stand to be removed is disconnected in the known manner and, again, the travelling block T is no longer supporting the pipe P so that the sensing device A is again returned to the open position illustrated in FIG. 3 which disengages the clutch 26. Then, when the travelling block T is lowered to pick up the next stand of pipe at approximately the derrick platform 10 in the known manner, the movement of the measuring line M downwardly with the travelling block T does not cause a reading on the indicator 30.

From the foregoing, it can be seen that the present invention provides an automatic indication of the total number of feet of pipe which is actually in the well at any time. It should be noted that although the sensing device A is illustrative of one type of device which will perform the intended and described function, other devices may be employed. For example, strain gauges of conventional construction may be incorporated in an electrical circuit with the clutch 26, wherein the strain gauges are located in any one of several locations, such as, on the dead line 14, under the rotary table at the derrick platform 10; under the crown block C; under the tubing or rod spider which is also located in proximity to the platform 10; or under a leg of the derrick D.

The foregoing disclosure and description of the invention are illustrative and explanatory thereof, and various changes in the size, shape, and materials as well as in the details of the illustrated construction may be made without departing from the spirit of the invention.

I claim:

1. An apparatus for automatically measuring pipe as it is run into and out of a well on a travelling block having a dead line therewith, for thereby determining the amount of pipe in a well, comprising:

a measuring line having one end thereof connected to a travelling block for longitudinal movements therewith;

a measuring unit having a measuring wheel engaged by said measuring line for transmitting movements of said measuring line to said measuring wheel;

said measuring unit having an indicator for indicating movements of said measuring wheel which are transmitted thereto;

clutch means between said measuring wheel and said indicator for operably connecting and disconnecting same so that when said clutch means is engaged, movements of said measuring line are indicated on said indicator, but when said clutch means is disengaged, movements of said line are not indicated on said indicator;

a normally bowed leaf spring mounted on the dead line and adapted for flexing in response to predetermined loads on the dead line caused by the weight of pipe suspended by said travelling block and having a switch actuating member movable with said leaf spring;

a switch support member mounted on one end of said leaf spring;

a switch on said support member and normally spaced from said leaf spring and said switch actuating member when no pipe is suspended from said travelling block but engageable by said switch actuating member when pipe is suspended from said travelling block; and means connecting said switch with said clutch means for engaging said clutch means to operably connect said measuring wheel to said indicator when said actuating member actuates said switch due to pipe being supported by the travelling block.

2. The apparatus set forth in claim 1, wherein:

said connecting means includes an electrical circuit between said switch and said clutch means; and said switch is an electrical switch which is a part of said electrical circuit and which is actuated when said sensing means senses that pipe is suspended from said travelling block.

3. The apparatus set forth in claim 1, including:

means connected to the other end of said measuring line for maintaining said measuring line under tension at all times.

* * * * *